United States Patent [19]
Dexter et al.

[11] 3,856,748
[45] Dec. 24, 1974

[54] COMPOSITIONS STABILIZED WITH HYDROXYPHENYL ACYLAMIDES

[75] Inventors: Martin Dexter, Briarcliff Manor; Martin Knell, Ossining, both of N.Y.

[73] Assignee: Ciba-Geigy Corporation, Ardsley, N.Y.

[22] Filed: Mar. 19, 1973

[21] Appl. No.: 342,335

Related U.S. Application Data

[60] Division of Ser. No. 125,828, March 18, 1971, Pat. No. 3,754,031, which is a continuation-in-part of Ser. No. 795,697, Jan. 31, 1969, abandoned.

[52] U.S. Cl.... 260/45.9 NC, 252/403, 260/45.85 S, 260/892
[51] Int. Cl..... C08g 51/60, C08g 51/58, C08d 9/08
[58] Field of Search ............. 260/45.9 NC, 559 A

[56] References Cited
UNITED STATES PATENTS

| | | | |
|---|---|---|---|
| 3,243,408 | 3/1966 | Donoian | 260/45.9 NC |
| 3,282,939 | 11/1966 | Spivack et al. | 260/45.9 NC |
| 3,457,328 | 7/1969 | Blatz et al. | 260/45.9 NC |
| 3,492,349 | 1/1970 | Doyle et al. | 424/324 |
| 3,529,982 | 9/1970 | Luethi et al. | 260/45.9 NC |
| 3,542,573 | 11/1970 | Biland et al. | 260/45.9 NC |

OTHER PUBLICATIONS

A. N. Takahashi et al., Yakugaku Kenkyu, Vol. 36, pp. 149–162, 1965.
Geigy Advertisement, Modern Plastics Encyclopedia, Vol. 45, No. 14A, p. 476, Oct. 1968.
Geigy Advertisement, Modern Plastics Encyclopedia, Vol. 45, No. 1A, p. 398, Sept. 1967.

Primary Examiner—Melvyn I. Marquis
Assistant Examiner—Gary R. Marshall

[57] ABSTRACT

Hydroxypenyl acylamide compounds having the formula

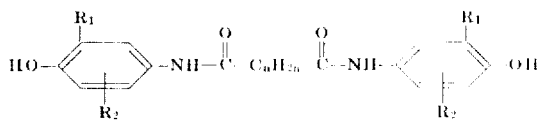

are prepared by reacting an alkyl aminophenol with an acyl chloride. These compounds are useful as stabilizers of organic materials which are subject to oxidative deterioration.

5 Claims, No Drawings

COMPOSITIONS STABILIZED WITH HYDROXYPHENYL ACYLAMIDES

This is a division of application Ser. No. 125,828, filed on Mar. 18, 1971, now U.S. Pat. No. 3,754,031, which in turn is a continuation-in-part of Ser. No. 795,697, filed Jan. 31, 1969, now abandoned.

DETAILED DESCRIPTION OF THE INVENTION

This invention relates to novel acylamide compounds. It also relates to the use of these compounds as stabilizers of organic materials which are normally subject to oxidative and/or thermal degradation.

The novel hydroxyphenyl acylamide antioxidant compounds of the present invention are represented by the formula

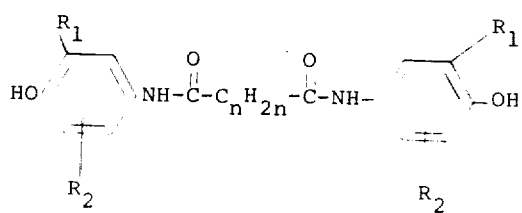

wherein
$R_1$ and $R_2$ are independently lower alkyl groups having from 1 to 6 carbon atoms, and
$n$ is a number from 2 to 10.

Illustrative examples of alkyl groups are methyl, ethyl, propyl, isopropyl, butyl, sec-butyl, tert-butyl, amyl, tert-amyl, hexyl and the like. The branched alkyl groups have been found to be particularly effective and the most preferred groups are tert-alkyl, such as t-butyl, t-amyl, and the like. The acyl moiety of the novel antioxidant compounds of the present invention are derived from dicarboxylic acids containing from 4 to 12 carbon atoms. Illustrative dicarboxylic acids include succinic acid, glutaric acid, adipic acid, pimelic acid, suberic acid, azelaic acid and sebacic acid.

The phenyl acylamide compounds of the present invention are prepared by reacting an aminophenol and an acyl chloride. The reaction is carried out in a solution containing the reacting materials. The useful solvents include ketones, hydrocarbons and aldehydes. Illustrative examples of such solvents are acetone, pyridine, dimethylformamide, methyl ethyl ketone, methyl isobutyl ketone, dioxane, and the like.

Stoichiometric amounts of the reactants are employed and a ratio of 1 mole of acyl chloride to 4 moles of aminophenyl can be used; a mole ration of 1:2 has been found to be particularly useful.

In the course of the reaction, hydrogen chloride is liberated forming the amine hydrochloride and consequently an alkaline material is used to neutralize the hydrogen chloride. Suitable alkaline materials which are used include, for example, sodium or potassium hydroxide, sodium or potassium acetate, sodium or potassium carbonate, sodium or potassium bicarbonate, and the like.

Illustrative examples of acyl chlorides which can be used are acid chlorides of adipic acid, succinic acid, sebacic acid, and the like.

In a typical reaction 1 mole of adipoyl chloride dissolved in acetone is added to 0.5 mole of an alkyl aminophenol such as, for example, 2,6-di-tert-butyl-4-aminophenol. An alkaline material, such as for example, sodium hydroxide, is then added to the solution, accompanied by agitation. The desired product is washed, selectively recovered and then dried to obtain the desired hydroxyphenyl acylamide.

These compounds may be incorporated in the polymer substance during the usual processing operations, for example, by hot-milling, the composition then being extruded, pressed, roll-molded or the like into films, fibers, filaments, hollow-spheres and the like. The heat stabilizing properties of these compounds advantageously stabilize the polymer against degradation during such processing at the high temperatures generally encountered.

The stabilizers employed in this invention can also be used in combination with other stabilizers or additives. Especially useful co-stabilizers are dilauryl-$\beta$-thiodipropionate and distearyl-$\beta$-thiodipropionate.

The following formula represents co-stabilizers which are in certain instances very useful in combination with the stabilizers of this invention:

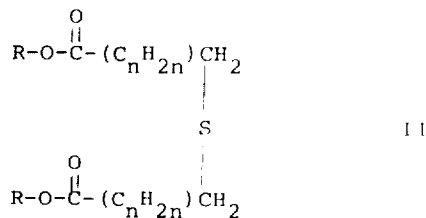

wherein R is an alkyl group having from 6 to 24 carbon atoms; and $n$ is an integer from 1 to 6. The above co-stabilizers are used in the amount of from 0.01 to 2% by weight of the organic material, and preferably from 0.1 to 1%.

Other antioxidants, antiozonants, thermal stabilizers, ultraviolet light absorbers, coloring materials, dyes, pigments, metal chelating agents, etc., may also be used in the compositions in combination with the stabilizers of the invention.

The following examples will further illustrate the nature of the present invention without introducing any limitations thereto.

EXAMPLE 1

N,N'bis(3,5-di-t-butyl-4-hydroxyphenyl)adipamide 11.05 g of 2,6-di-tert-butyl-4-aminophenol (prepared by the procedure described in U.S. Pat. No. 3,156,690) is dissolved in 90 ml acetone and 4.57 g adipoyl chloride in 10 ml acetone is added portionwise thereto. The reaction is mildly exothermic and some solid material separates. Dilute sodium hydroxide (50 ml of 1N) is added portionwise, accompanied by shaking. After the exothermic reaction is ended, 50 ml water is added to the reaction mixture followed by cooling and the mixture is then filtered. The solid material is washed twice with 50 ml portions of cold petroleum ether to remove most of the red coloration and this is followed by drying. The weight of the product obtained is 8.87 g; melting point 269°–272°. After recrystalization from ethanol, the desired product is obtained in a yield of about 35%; a melting point of 274°–276° dec.

| Analysis: | Calculated | C. 73.87 | H. 9.48 |
|---|---|---|---|
| | Found | C. 73.64; | H. 9.43 |

EXAMPLE 2

N,N'-bis(3,5-di-t-butyl-4-hydroxyphenyl)sebaceamide

The procedure of Example 1 was followed except that sebacoyl chloride was employed. The above named product was obtained which, after recrystallization from ethanol-water mixture, had a melting point of 211°–213°C.

| Analysis: | Calculated | C, 74.96; | H, 9.93; | N, 4.60 |
|---|---|---|---|---|
| | Found | C, 74.74; | H, 9.87; | N, 4.36. |

EXAMPLE 3

N,N'-bis(3-methyl-4-hydroxy-5-t-butylphenyl)adipamide

The procedure of Example 1 was followed except that 2-methyl-6-t-butyl-4-aminophenol was employed. The above named product was obtained which, after recrystallization from ethanol-water mixture, had a melting point of 259°–260.5°C.

| Analysis: | Calculated | C, 71.76; | H, 8.60; | N, 5.98 |
|---|---|---|---|---|
| | Found | C, 71.36; | H, 8.96 | N, 5.77. |

EXAMPLE 4

N,N'-bis(3-methyl-5-t-butyl-4hydroxyphenyl)sebacamide

Following the procedure described in Example 1, supra, except for the use of 2-methyl-6-t-butyl-4-aminophenol (prepared by the procedure described in U.S. Pat. No. 3,156,690) and sebacoyl acid chloride, N,N'-bis(3-methyl-5-t-butyl-4-hydroxyphenyl)sebacamide is obtained.

Following the above described procedures, the following compounds are also prepared:

N,N'-bis(2-methyl-5-t-butyl-4-hydroxyphenyl)suberamide,

N,N'-bis(3,5-di-isobutyl-4-hydroxyphenyl)pimelamide,

N,N'-bis(3,5-di-tert-hexyl-4-hydroxyphenyl)adipamide.

Since the oxidation of organic materials is slow at ambient temperatures, even in the absence of antioxidants, the testing of the effects of antioxidants must be conducted at elevated temperatures in order to obtain results within a convenient time. The tests conducted on the following material were made following oven aging in a forced draft oven, at a temperature of 300°C.

EXAMPLE 5

Unstabilized polypropylene powder, (Hercules) Profax 6501) was thoroughly blended with 0.5% by weight of N,N'-bis(3,5-di-t-butyl-4-hydroxyphenyl)adipamide. The blended material was then milled on a two-roller mill at 182°C, for 10 minutes, after which the stabilized polypropylene was sheeted from the mill and allowed to cool.

The polypropylene sheet was then cut into pieces and pressed for 7 minutes on a hydraulic press at 218°C and 2,000 pounds per square inch pressure. The resultant sheet of 25 mil thickness was tested for resistance to accelerated aging in a force draft oven at 300°F. Unstabilized polypropylene specimen began to decompose within three hours. However, under the same conditions, the polypropylene containing the aforementioned antioxidant showed signs of decomposition only after 205 hours.

Similar results are obtained when N,N'-bis(3-methyl-5-t-butyl-4-hydroxyphenyl)sebacamide and N,N'-bis(3,5-dimethyl-4-hydroxyphenyl)adipamide are employed in place of the compound used in the above example.

EXAMPLE 6

Stabilized rubber is prepared by mixing in the cold:

| | Parts |
|---|---|
| Hevea latex crepe | 100.0 |
| Stearic acid | 1.5 |
| Zinc oxide | 5.0 |
| Diphenylguanidine | 1.0 |
| Sulfur | 2.5 |
| N,N'-bis(3,5-di-t-butyl-4-hydroxyphenyl)adipamide | 1.0 |

The resultant mixture is vulcanized at 140°C and tested according to ASTM D-1206-52T. It was found that the time required to elongate a test strip from 120 mm to 170 mm is considerably shorter for the unstabilized rubber as compared with the stabilized rubber. Similarly, styrene-butadiene rubber as well as a blend of natural rubber (50 parts) and polybutadiene rubber (50 parts) are stabilized.

EXAMPLE 7

High impact polystyrene resin containing elastomer (i.e., butadiene-styrene) is stabilized against loss of elongation properties by incorporation of 0.5% by weight of N,N'-bis(3,5-di-t-butyl-4-hydroxyphenyl)adipamide. Under the test conditions described below, the stabilized resin retains a higher percentage of its original elongation properties, whereas the unstabilized resin retains less elongation properties.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° and a pressure of 2,000 pounds per square inch into a sheet of uniform thickness (25 mil). The sheets are then cut into strips, approximately 4 × 0.5 inches. a portion of these strips is then measured for length of elongation in the Instron Tensile tester (Instron Engineering Corporation, Quincy, Massachusetts). The remaining portion of the strips is aged in a forced draft oven for 6 weeks at 75°C and thereafter tested for elongation.

Similar results are obtained with a terpolymer of acrylonitrile-butadiene-styrene.

What is claimed is:

1. A composition of matter comprising polypropylene, natural rubber or butadiene-styrene elastomer normally subject to oxidative deterioration containing from 0.005 to 5% by weight of a hydroxyphenyl acylamide having the formula

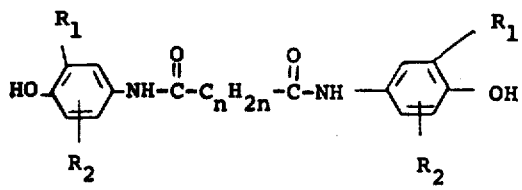

wherein

R$_1$ and R$_2$ are independently alkyl groups containing up to 6 carbon atoms, and $n$ is a number from 2 to 10.

2. The composition of claim 1 wherein said acylamide is N,N'-bis(3,5-di-t-butyl-4-hydroxyphenyl)adipamide.

3. The composition of claim 1 wherein said acylamide is N,N'-bis(3,5-di-t-butyl-4-hydroxyphenyl)sebacamide.

4. The composition of claim 1 wherein said acylamide is N,N'-bis(3-methyl-4-hydroxy-5-t-butylphenyl)adipamide.

5. A composition of matter of claim 1 wherein there is additionally 0.01 to 2% by weight of polyolefin a co-stabilizer selected from dilauryl-β-thiodipropionate and distearyl-β-distearylthiodipropionate.

* * * * *